(12) United States Patent
Hinque

(10) Patent No.: US 9,308,784 B2
(45) Date of Patent: Apr. 12, 2016

(54) PNEUMATIC TIRE COMPRISING AN AIR PRESSURE REGULATOR AND PRESSURE REGULATOR KIT

(71) Applicant: The Goodyear Tire & Rubber Company, Akron, OH (US)

(72) Inventor: Daniel Paul Luc Marie Hinque, Habay-la-Neuve (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 359 days.

(21) Appl. No.: 14/100,121

(22) Filed: Dec. 9, 2013

(65) Prior Publication Data

US 2015/0158346 A1   Jun. 11, 2015

(51) Int. Cl.
*B60C 23/00* (2006.01)
*B60C 23/12* (2006.01)

(52) U.S. Cl.
CPC .............. *B60C 23/001* (2013.01); *B60C 23/12* (2013.01); *Y10T 152/10495* (2015.01)

(58) Field of Classification Search
CPC ................. B60C 23/001; B60C 23/12; Y10T 152/10495
USPC ................ 152/415, 418, 419, 424, 425, 426; 417/233, 375, 379, 383
See application file for complete search history.

(56) References Cited

U.S. PATENT DOCUMENTS

| 2013/0048178 A1* | 2/2013 | Hinque | B60C 23/12 152/450 |
| 2013/0112328 A1* | 5/2013 | Hinque | B60C 19/04 152/450 |
| 2013/0112329 A1* | 5/2013 | Hinque | B60C 23/12 152/450 |
| 2013/0160917 A1 | 6/2013 | Hinque et al. | |
| 2014/0158267 A1* | 6/2014 | Gobinath | B60C 19/00 152/450 |

* cited by examiner

*Primary Examiner* — S. Joseph Morano
*Assistant Examiner* — Jean Charleston
(74) *Attorney, Agent, or Firm* — David L. King

(57) ABSTRACT

A self-inflating tire assembly comprises a tire having a tread region, first and second sidewalls, and first and second bead regions, wherein the first and second sidewalls extend respectively from the first and second bead regions to the tread region, wherein the tread region and the first and second sidewalls enclose an annular tire cavity. Further, the assembly comprises an air passageway connected to one of the sidewalls and extending essentially in a circumferential direction of the tire for pumping air from outside of the tire into the tire cavity, wherein the air passageway has an air passageway inlet for receiving air from outside of the tire and an air passageway outlet for releasing air into the tire cavity. Moreover, the assembly comprises an air pressure regulator having an air pressure regulation chamber, a connector end, and a channel fluidly connecting the pressure regulation chamber with the connector end, wherein the air pressure regulator is detachably connected to one of the air passageway inlet and the air passageway outlet via the connector end for allowing fluid communication between channel and the air passageway via the connector end. In addition, the invention relates to a pressure regulator kit for regulating the pressure of a tire, the kit comprising a plurality of air pressure regulators.

25 Claims, 6 Drawing Sheets

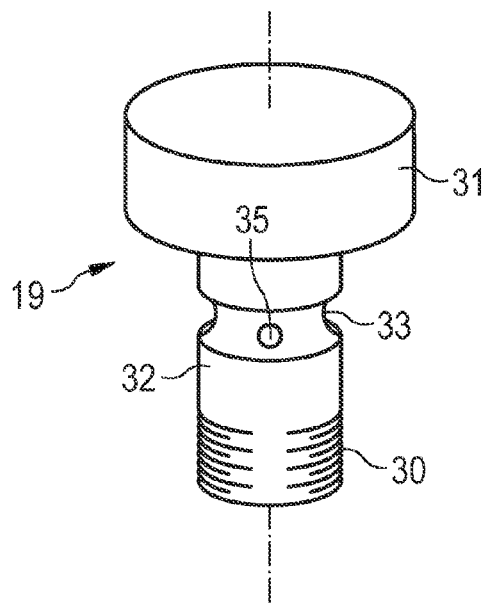
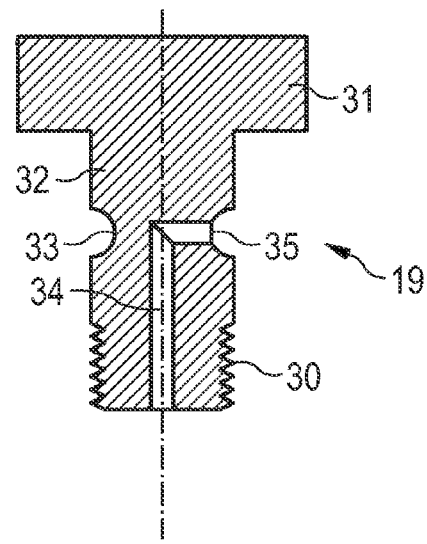
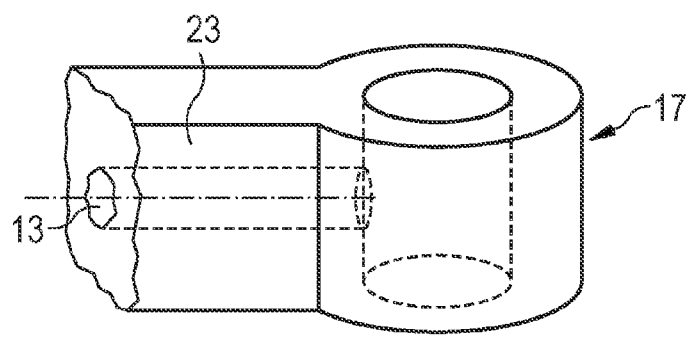
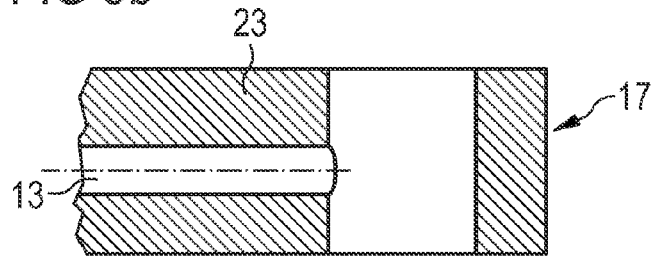

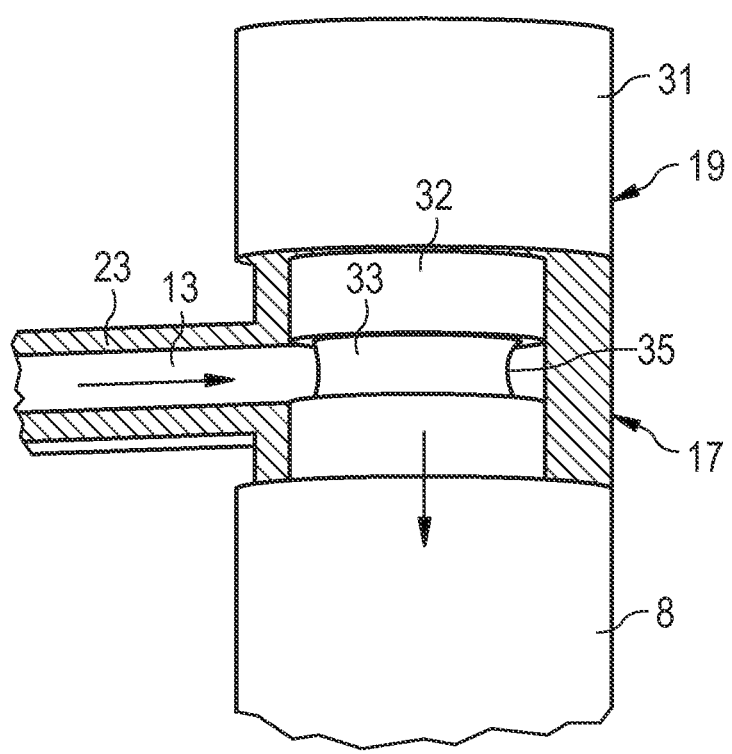

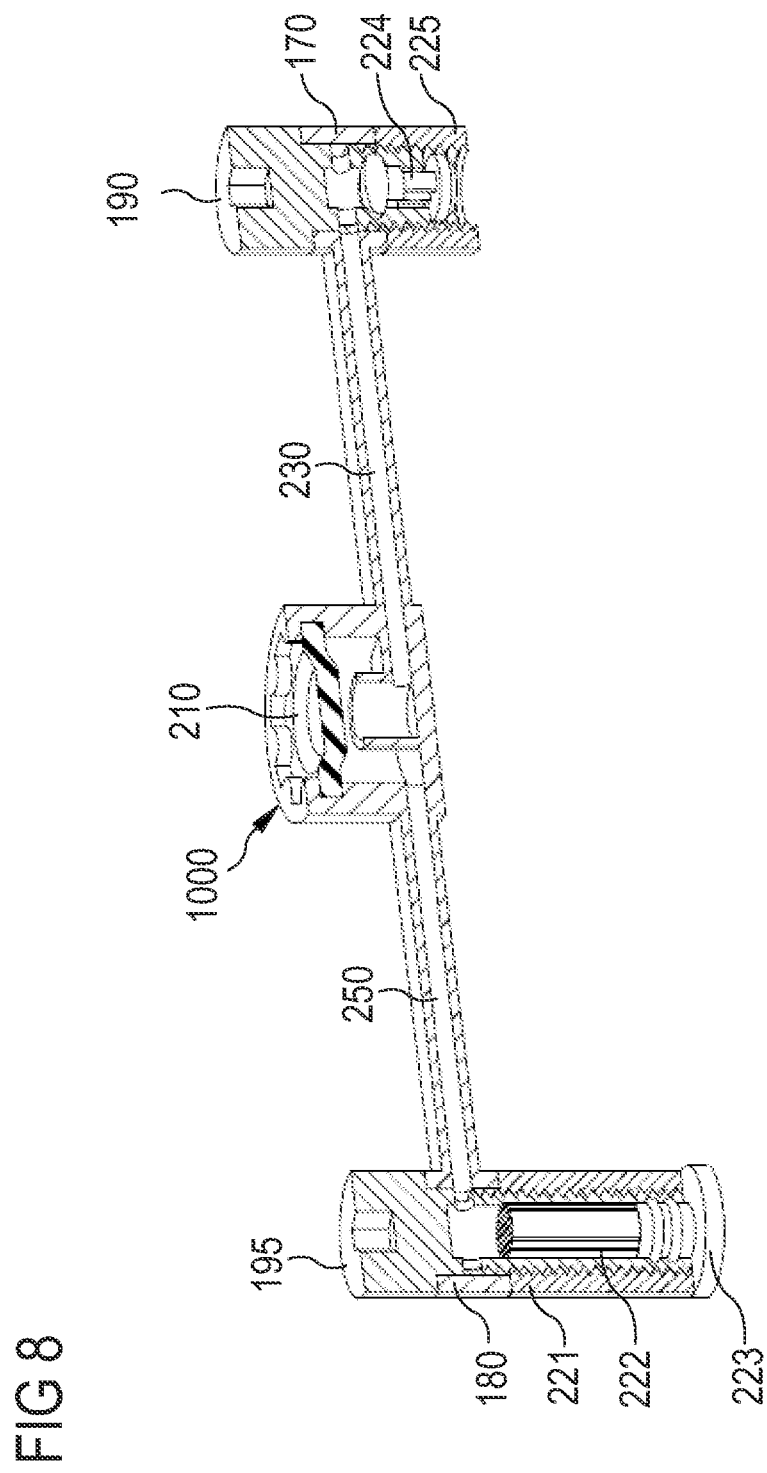

PNEUMATIC TIRE COMPRISING AN AIR PRESSURE REGULATOR AND PRESSURE REGULATOR KIT

FIELD OF THE INVENTION

The present invention is directed to a pneumatic tire, in particular self-inflating pneumatic tire, comprising an air pressure regulator. Further, the present invention relates to kit comprising a plurality of air pressure regulators and connecting elements.

BACKGROUND OF THE INVENTION

Normal air diffusion reduces tire pressure over time so that the natural state of tires is underinflated. Accordingly, drivers should constantly check tire pressure to avoid increased fuel consumption or wear and to avoid impeded braking and/or handling performance. Even more, a substantially underinflated tire may constitute a severe safety risk. Tire pressure monitoring systems have been proposed to warn drivers when tire pressure is significantly low. Such systems, however, remain dependent upon the driver taking remedial action when warned to reinflate a tire to a recommended pressure.

It is desirable, therefore, to provide components which allow or help to provide an automatic inflation of a tire without requiring any action of the driver. Of course, these components should be easily and cost-effectively mountable to the tire.

Document US 2013/0048178 A1 discloses a self-inflating tire assembly including an air tube connected to a tire and defining an air passageway. The air tube is sequentially flattened by the tire footprint in a direction opposite to a tire direction of rotation to pump air along the passageway into the tire cavity. An inlet device is positioned within the annular passageway 180 degrees opposite to an outlet device such that the sequential flattening of the air tube by the tire footprint effects pumping of air along the air passageway with the tire rotating in either a forward or reverse direction of rotation. The assembly includes also an inlet device for regulating the inlet flow of the air tube pump, wherein the inlet device is fixedly mounted within the tire's sidewall.

SUMMARY OF THE INVENTION

In a first aspect, the present invention relates to a self-inflating tire assembly comprising a tire having a tread region, first and second sidewalls, and first and second bead regions, wherein the first and second sidewalls extend respectively from the first and second bead regions to the tread region, and wherein the tread region and the first and second sidewalls enclose an annular tire cavity. Further, the tire assembly comprises an air passageway connected and/or arranged within one of the sidewalls and extending essentially in a circumferential direction of the tire for pumping air from outside of the tire into the tire cavity, the air passageway having an air passageway inlet for receiving air from outside of the tire and an air passageway outlet for conducting air into the tire cavity. Still in accordance with the first aspect, the tire assembly comprises an air pressure regulator or an inlet pressure regulator having an air pressure regulation chamber, at least one connector end, and a channel fluidly connecting the pressure regulation chamber with the at least one connector end, wherein the air pressure regulator is detachably connected or mounted to one of the air passageway inlet and the air passageway outlet via the connector end for allowing fluid communication between channel and the air passageway via the connector end.

The detachable connection or mounting of the pressure regulator allows a flexible application and/or the exchange of the regulator against another regulator having for example another regulation property, as e.g. another threshold pressure value up to which air is allowed to enter the tire cavity. Above such a threshold value of air pressure in the tire cavity, air may be blocked from entering the tire cavity to avoid critically high pressure values inside the tire cavity.

According to an aspect, the pressure regulator is attached to one of the tire's sidewalls and is arranged entirely within the tire cavity. In contrast, several prior art device are mounted within or through the sidewall, thereby inhibiting or impeding replacement of a regulator or increasing costs for mounting the regulator. Furthermore, the costs for the production of a tire incorporating such a device may be elevated.

According to another aspect, the tire assembly further comprises a connection screw for detachably mounting the connector end to the air passageway, the connection screw comprising an air duct extending through the screw for fluidly connecting the air passageway with the channel of the air pressure regulator. Such a screw may facilitate the mounting of the air pressure regulator to the air duct and allows also for fluid communication between the channel of the air pressure regulator and the air duct.

According to another aspect, the connection screw has a threaded portion for connecting the connection screw to the air passageway, and wherein the threaded portion has an essentially hollow cylindrical shape allowing air to pass through the screw.

According to yet another aspect, the connection screw has a screw head opposite to the threaded portion, and an intermediate portion arranged between that head portion and the threaded portion, wherein the air duct extends through the threaded portion and the intermediate portion to an outer surface of the intermediate portion for fluidly connecting the air passageway with the channel of the air pressure regulator.

According to a further aspect, the intermediate portion has an annular groove extending around a central axis of the screw, the annular groove being in fluid connection with the air duct. Such a feature may facilitate mounting of the regulator and assure the operation of the latter.

According to another aspect, an end of the air passageway comprises an inner thread for connecting the thread of the connection screw to the inner thread of the air passageway. Alternatively, the inner thread may also be provided in an insert arranged within that end of the air passageway. However, such an inner thread is not an essential feature. The screw may be fixed only by the thread of the screw engaging the inner wall of the air passageway. In addition or alternatively, the thread of the screw may cut a hole and/or thread inside the air passageway. Then the threaded portion of the screw may have a sharp tip for cutting a hole into the air passageway.

According to another aspect, the pressure regulator comprises an elongated channel portion comprising the channel. Further, the end connector may have an essentially hollow cylindrical shape defining an inner surface for receiving the intermediate portion of the connection screw therein. The hollow cylindrical shape may extend perpendicularly to the channel portion. The inner surface may have an opening or aperture in fluid communication with the channel to allow air to pass out of the screw into the channel of the pressure regulator when the end connector is mounted via the connection screw.

According to another aspect, the pressure regulator comprises two elongated channel portions extending linearly from opposite sides of the pressure regulation chamber. At each end of that elongated portions may be arranged an end connector. Thus, the regulator may also be fluidly connected via both end connectors to two air passageways by connecting a first connector end to the outlet of a first air passageway and a second connector end to an inlet of a second air passageway. In other words, the air pressure regulator may be (fluidly) interposed or interconnected in an air passageway. One of these air passageways may be a through hole or channel extending across the sidewall of the tire, i.e. from an outer surface of the sidewall facing the away from the tire cavity to an inner surface of the sidewall facing the tire cavity.

According to another aspect, both elongated channel portions extend essentially in parallel with a circumferential direction of the tire.

According to still another aspect, the pressure regulator comprises a pressure regulating member or resilient pressure regulating member having two opposite sides, wherein a first side faces the tire cavity and the second side faces the pressure regulation chamber. In other words, the first side is subject to tire cavity pressure and the second side is subject to the pressure provided by the air passageway to the pressure regulator.

According to yet another aspect, the pressure regulation chamber comprises an opening or seat connecting the pressure regulation chamber with the channel, wherein the pressure regulating member may reversibly move or deform to reversibly open and close the opening to reversibly allow or block air flow between the pressure regulation chamber and the channel. In other words, the pressure regulating member could be described as a valve and the opening within the pressure regulation chamber could be described as a valve seat.

According to another aspect, the pressure regulating member is configured to reversibly block air flow through the opening into the tire cavity above a defined threshold pressure value inside the tire cavity.

In a further aspect, the pressure regulating member is one of a biased piston and a flexible membrane. In case of a flexible membrane, and when the tire cavity pressure is below a defined threshold pressure value, the membrane leaves the opening inside the pressure regulation chamber open and allows air to pass the pressure regulation chamber into the channel. When tire cavity pressure exceeds the threshold value, the membrane deforms and closes the opening and inhibits thus air flow through the pressure regulating chamber. In case of a biased piston (e.g. biased by a spring or another resilient member), and when the tire cavity pressure is below a defined threshold pressure value, the piston leaves the opening inside the pressure regulation chamber open by being resiliently forced into a direction allowing air flow through the opening. When tire cavity pressure exceeds the threshold value, the tire cavity pressure exceeds a restoring force of the biased piston and closes the opening and inhibits thus air flow through the pressure regulating chamber.

In still a further aspect, the pressure regulating member is a membrane extending essentially in parallel to the tire's sidewall at the mounting location of the pressure regulator.

In another aspect, the pressure regulator comprises a first pressure regulator inlet or outlet at the connector end, in particular in a hollow cylindrical portion of the connector end. Further, the pressure regulator may comprise a second inlet or outlet which may be arranged in a second connector end, as for example in a hollow cylindrical portion of the connector end, or on the pressure regulation chamber or on a duct extending from the pressure regulation chamber.

Moreover, the present invention relates to a pressure regulator kit for regulating the tire cavity pressure of a pneumatic tire. The kit comprises a plurality of air pressure regulators, wherein each air pressure regulator comprises a pressure regulation chamber, at least one connector end, and a channel fluidly connecting the pressure regulation chamber with each of the connector ends. Further, the kit comprises a connection screw for detachably mounting the connector end to an air passageway in a tire's sidewall, wherein the connection screw comprises an air duct extending through the screw for allowing air to pass through the screw into the channel when the connector end is mounted with the connection screw to the air passageway.

In an aspect, the connection screw has a threaded portion for connecting the screw to the air passageway, and wherein the threaded portion has an essentially hollow cylindrical shape allowing air to pass through the threaded portion.

In another aspect, the connection screw has a head portion and an intermediate portion between the head portion and the threaded portion, wherein the air duct extends through the threaded portion and the intermediate portion to an outer surface of the intermediate portion for connecting the air passageway with the channel of the air pressure regulator.

In yet another aspect, the intermediate portion has an annular groove extending about a central axis of the screw, the annular groove being in fluid connection with the air duct.

In yet another aspect, the pressure regulator comprises an elongated channel portion comprising the channel. Further, the end connector may have an essentially hollow cylindrical shape defining an inner surface for receiving the intermediate portion of the connection screw therein. The inner surface may have an opening fluidly connected with the channel to allow air to pass out of the screw into the channel of the pressure regulator when the end connector is mounted with the connection screw.

According to another aspect, the pressure regulator comprises two connector ends and two elongated channel portions extending linearly from opposite sides of the pressure regulation chamber.

According to yet another aspect, each pressure regulator allows air to pass the pressure regulator up to a defined threshold pressure inside the tire cavity, and wherein above that threshold pressure, air flow through the pressure regulator is blocked.

In another aspect, each pressure regulator has threshold pressure different from another pressure regulator of the plurality of pressure regulators.

In a further aspect, the threshold pressures of the plurality of pressure regulators are of between 1 to 4 bar, and wherein each threshold pressure of one of the plurality of pressure regulators differs from the threshold pressure of another one of the plurality of pressure regulators by at least 0.05 bar, preferably by at least 0.1 bar.

In a further aspect, the regulator kit comprises a check valve blocking air flow through the air passageway from the tire cavity out of the tire and allowing air flow through the air passageway into the tire cavity. The check valve may be at least partially arranged within the air duct of a connection screw, as for example in the hollow cylindrical, threaded portion.

In a further aspect, the regulator kit comprises a filter configured to be placed inside the air duct of a connection screw, as for example in the hollow cylindrical and threaded portion of the connection screw.

All features of the above described aspects of the invention may be combined with or replaced by one another.

Definitions

"Axial" or "axially" mean lines or directions that are parallel to the axis of rotation of the tire.

"Bead" means that part of the tire comprising an annular tensile member commonly referred to as a "bead core" wrapped by ply cords and shaped, with or without other reinforcement elements such as flippers, chippers, apexes, toe guards and chafers, to fit the design rim.

"Belt structure" or "reinforcing belts" means at least two annular layers or plies of parallel cords, woven or unwoven, underlying the tread, unanchored to the bead, and having both left and right cord angles in the range from 17 degrees to 27 degrees with respect to the equatorial plane of the tire.

"Carcass" means the tire structure apart from the belt structure, tread, undertread, and sidewall rubber over the plies, but including the beads.

"Circumferential" means lines or directions extending along or in parallel to the perimeter of the surface of the annular tread perpendicular to the axial direction.

"Equatorial Plane" means the plane perpendicular to the tire's axis of rotation and passing through the center of the tread.

"Peristaltic" means operating by means of wave-like contractions that propel contained matter, such as air, along tubular pathways.

"Radial" or "radially" means directions radially toward or away from the axis of rotation of the tire.

"Sidewall" means that portion of a tire between the tread and the bead.

"Tread" means a rubber component which when bonded to a tire carcass includes that portion of the tire that comes into contact with the road when the tire is normally inflated and under normal load.

BRIEF DESCRIPTION OF THE DRAWINGS

In the following, the Figures according to the embodiments of the present invention are briefly described. Further details are given in the detailed description of the embodiments. The Figures have the purpose of illustrating the invention and should not be understood in a limiting sense.

FIG. 4a is a perspective view of a screw for mounting the air pressure regulator according to FIG. 2 to an air passageway.

FIG. 4b is a cross-sectional view of the screw according to FIG. 4a.

FIG. 5a is a perspective view of a connector portion of the air pressure regulator as depicted in FIG. 2.

FIG. 5b is a cross-sectional view of the connector portion depicted in FIG. 5a.

FIG. 6b is a schematic diagram representing pressure values versus time for the different pressure regulators depicted in FIG. 6a.

FIG. 7 is a perspective, partially cross-sectional view of the connecting portion mounted to an air channel as shown in FIG. 2.

FIG. 8 is a perspective, partially cross-sectional view of a pressure regulator kit according to an embodiment of the present invention.

DETAILED DESCRIPTION OF THE EMBODIMENTS

Figure 1:
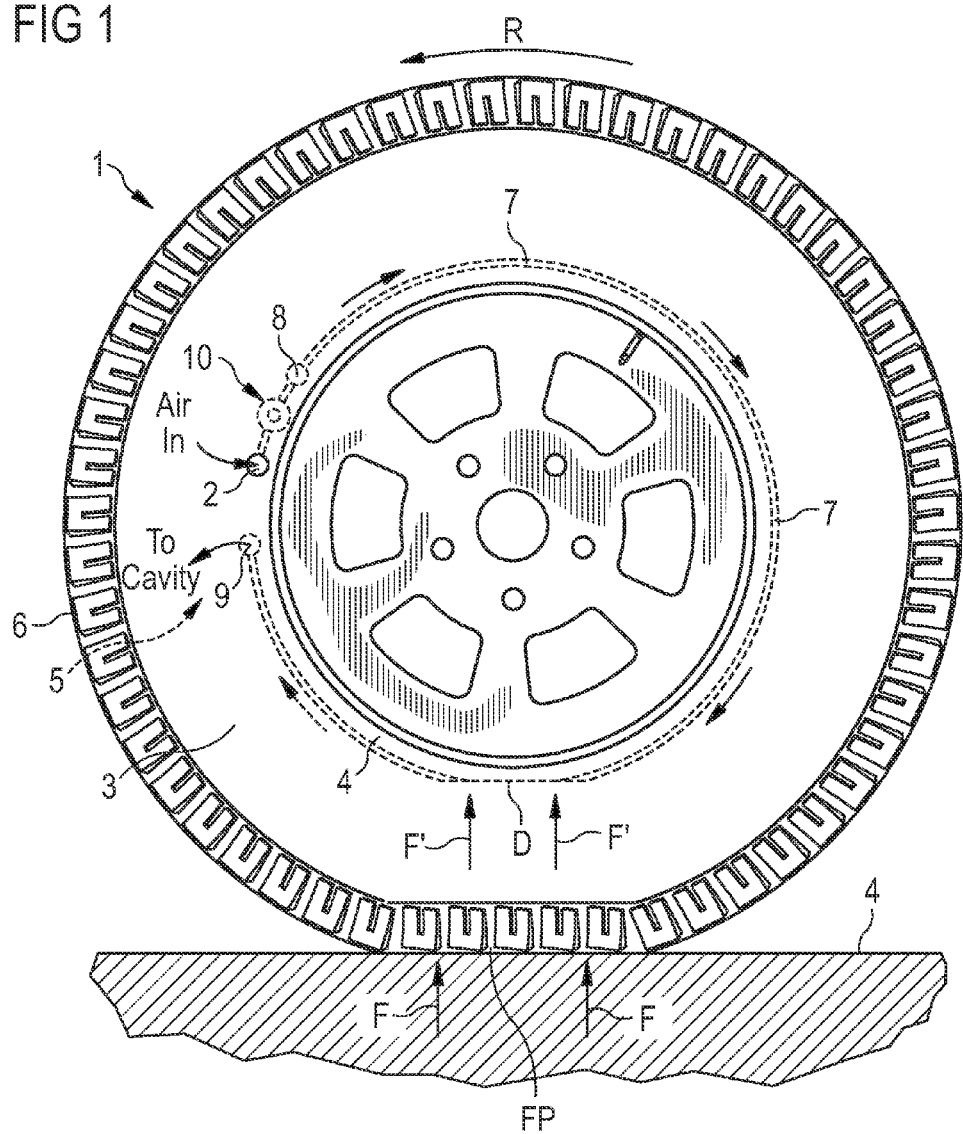
FIG. 1 is a partially transparent side view of a tire comprising an air pressure regulator according to a preferred embodiment of the present invention.

FIG. 1 represents a tire assembly according to a preferred embodiment of the invention. The assembly comprises a tire 1 having two sidewalls 3 (only one is shown in FIG. 1) extending respectively between two bead regions 4 (only one is shown in FIG. 1) and a tread portion 6. Further, the tire assembly comprises an air passageway or tube 7 connected to the tire 1 and extending essentially in a circumferential direction of the tire 1. The air passageway 7 comprises an air inlet 8 connected to a pressure regulator 10 and an air outlet 9 connecting the air passageway 7 with the tire cavity 5. The pressure regulator 10 is connected to an air inlet 2 extending across the sidewall 3 such that air may pass from outside of the tire 1 through the air inlet 2 into the pressure regulator 10 and from the air pressure regulator 10 into the inlet of the air passageway 7, and finally through the air passageway 7 into the tire cavity 5. In this context, the flow of air through the air passageway 7 may be driven by the rotation of the tire over the ground, wherein in a footprint area of the tire FP, the tire 1 and in particular its sidewall 3 reversibly deforms such that the air passageway is sequentially closed in the footprint area of the tire 1. As shown in FIG. 1, the tire 1 is deformed by a force F under the load of the vehicle and/or the tire 1 in the footprint area FP such that the air passageway 7 is deformed in a deformation region D above the footprint area FP by a force F'. The rotation of the tire in the direction of rotation R results in an oppositely directed flow of air through the air passageway 7 as shown by the arrows indicating the direction of flow through the air passageway 7.

Figure 2:
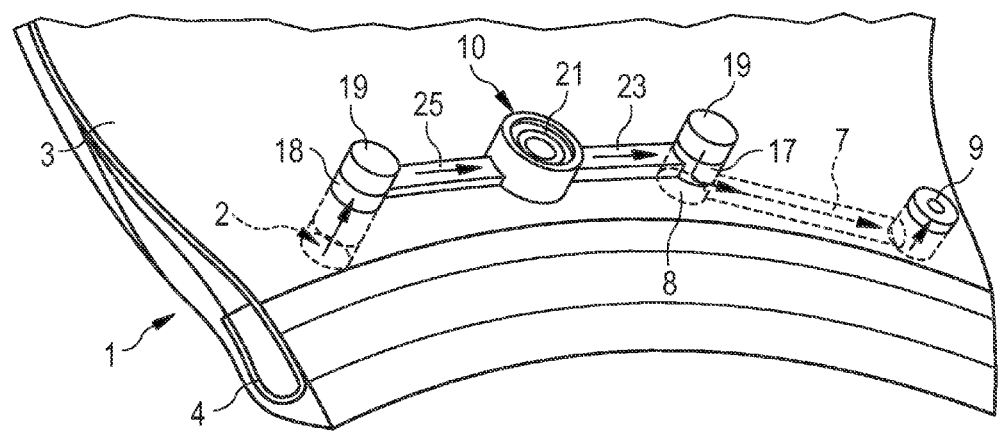
FIG. 2 is a perspective, partially cross-sectional view of a tire comprising an air pressure regulator according to an embodiment of the present invention.

FIG. 2 is a simplified and partial cross-sectional view of the situation depicted in FIG. 1. In contrast to FIG. 1, and for the sake of an improved intelligibility, the air passageway 7 is schematically depicted with a shorter length than in FIG. 1. Thus, FIG. 2 represents a partial cross section through the tire's sidewall 3 extending from the bead region 4. In the non-limiting example, the tire 1 comprises an air channel or inlet 2 extending through the sidewall 3, wherein the inlet 2 extends essentially perpendicularly across the sidewall 3. Thus, air may enter the tire 1 through that inlet 2. Air passageway or tube 7 extends essentially in a circumferential direction within the tire's sidewall 3. In general, the air passageway 7 may be an integral element of the tire 1 or may be a separate tube 7 placed into a corresponding groove in the sidewall 3. Such a tube 7 could be glued to the tire 1 and/or held in place by mechanical clamping in a groove. The present invention allows all of these possibilities. The depicted air passageway 7 is connected to an air outlet 9 for releasing air into the tire cavity. Although the air outlet 9 is depicted as cylindrical member, it may also be only a hole connecting the air passageway 7 with the tire cavity. In general, a check valve may be included in tube 7, in the pressure regulator 10 or, for example, in the air outlet 9, in order to avoid that air exits the tire cavity again.

The air pressure regulator 10 is connected with an end connector 17 to the inlet 8 of the air passageway 7. Further, it may be connected with a further end connector 18 with the air inlet 2. Moreover, the air pressure regulator 10 has a pressure regulation chamber 21 which is mechanically and fluidly connected to the end connectors 17, 18 via channel portions 23, 25. Both channel portions 23, 25 comprise each a channel allowing air to pass between the respective end connector 17, 18 and the pressure regulation chamber 21.

Figure 3:
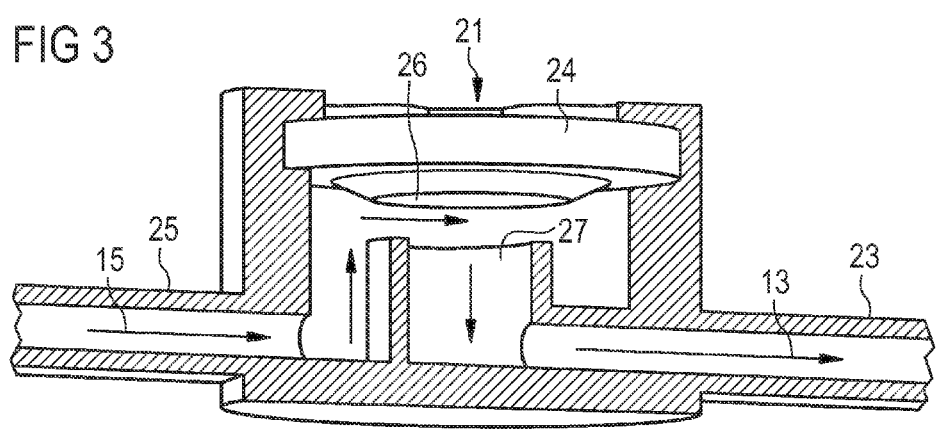
FIG. 3 is a partial perspective cross-sectional view of the air pressure regulator according to FIG. 1.

FIG. 3 is a partial cross-sectional view of the pressure regulation chamber 21. Accordingly, the pressure regulation chamber 21 is provided between the first channel portion 23 comprising the first channel 13 and the second channel portion 25 comprising the second channel 15. Further, the pressure regulation chamber comprises a pressure regulating member 24 in the form of a flexible membrane 24. One side of the membrane 24 faces the inner volume of the pressure regulation chamber 21 and the opposite side faces and contacts the volume of the tire cavity. When tire pressure is below a definable threshold value, which may for instance be chosen by the position, shape, size and/or the material of the membrane 24, the membrane is pushed by the tire pressure inside of the volume of the pressure regulation chamber 21 so as to close a seat 27 or aperture 27 of the pressure regulation chamber 21 such that air flow through the pressure regulation chamber is blocked. The seat 27 may have a substantially hollow cylindrical shape with an opening in parallel to the extension of the membrane 24 such that a deformation of the membrane 24 due to a high tire cavity pressure may block the circular opening of the hollow cylindrical seat 27. For that purpose the membrane 24 may have a plate shaped bulge 26 extending into the direction of the seat 27's opening.

FIG. 4a shows a screw 19 for connecting one of the connector ends 17, 18 to the sidewall 3, an air passageway 7 or inlet 2. The screw 19 has a threaded portion 30 which may serve for connecting the screw 19 to the air inlet 2 or to the air passageway 19. Although not depicted the screw 19 could have a sharp and/or threaded tip which allows the screw 19 to cut a hole through the sidewall 3 into the passageway 7 or inlet 2, thereby forming an air inlet or outlet in the passageway 7. Alternatively, the air passageway 7 and/or the air inlet 2 may comprise an opening having an inner thread for connecting the screw 19 to the inner thread (not depicted). In addition, the interface between the screws thread 30 and the inlet 2 or air passageway 7 may be sealed with a sealing agent or glue, as for instance silicone or a thread-locking fluid, as for example Loctite® Thread Locker. Opposite to the threaded portion 30, the screw 19 comprises a head portion 31, especially for driving the screw and or holding a connector end 17, 18 of the pressure regulator 10. Between the head portion 31 and the threaded tip portion 30 is positioned an intermediate portion 32, preferably comprising an annular groove 33, having an opening 35 connecting a duct inside the screw 19 with the outer surface of the intermediate portion 32.

FIG. 4b is a cross section of the screw 19 depicted in FIG. 4a along the screw's central axis. According to that Figure, the threaded portion 30 and at least a part of the intermediate portion 32 comprises a bore or duct 34 being in fluid connection with the opening 35 in the outer surface of the intermediate portion 32 (especially arranged in the annular groove 33). This duct 34 extends through the threaded portion 30 along the screw's central axis.

FIG. 5a shows in detail the connector end 17. The connector end 17 is attached to the channel portion 23 comprising the channel 13. Channel 13 ends in an opening or aperture in the hollow cylindrical portion of the connector end 17. In particular, the position of that opening corresponds to the position of the opening 35 and/or of the annular groove 33 of the screw 19 when the screw 19 is completely inserted through the connector end 17 with the head portion 31 of the screw 19 contacting the connector end 17. Connector end 19 may have the same or a similar design as the connector end 17.

FIG. 5b represents a cross-sectional view through connector end 17 as depicted in FIG. 5a with the cross section in parallel with the elongated channel portion 23 and perpendicular to the sidewall 3 at the mounting location of the pressure regulator 10.

FIG. 7 depicts in the same context a screw 19 inserted through the hollow cylindrical portion of the connector end 17. The head portion 31 of the screw 19 contacts the connector end 17 and the annular groove 33 is in fluid communication with the channel 13 of the channel portion 23. Preferably, the head portion 31 contacts the connector end 17 tightly. For example, sealing members or material may be provided at the interface between the head portion 31 and the connector end 17. The same may apply to the interface between the connector end 17 and the air inlet 8. Accordingly, air may pass through the channel 13 into the annular portion 33 and via the hole 35 into the duct of the screw (not depicted in FIG. 7). The threaded portion 30 is screwed into the air inlet 8 of the air passageway.

Figure 6A:
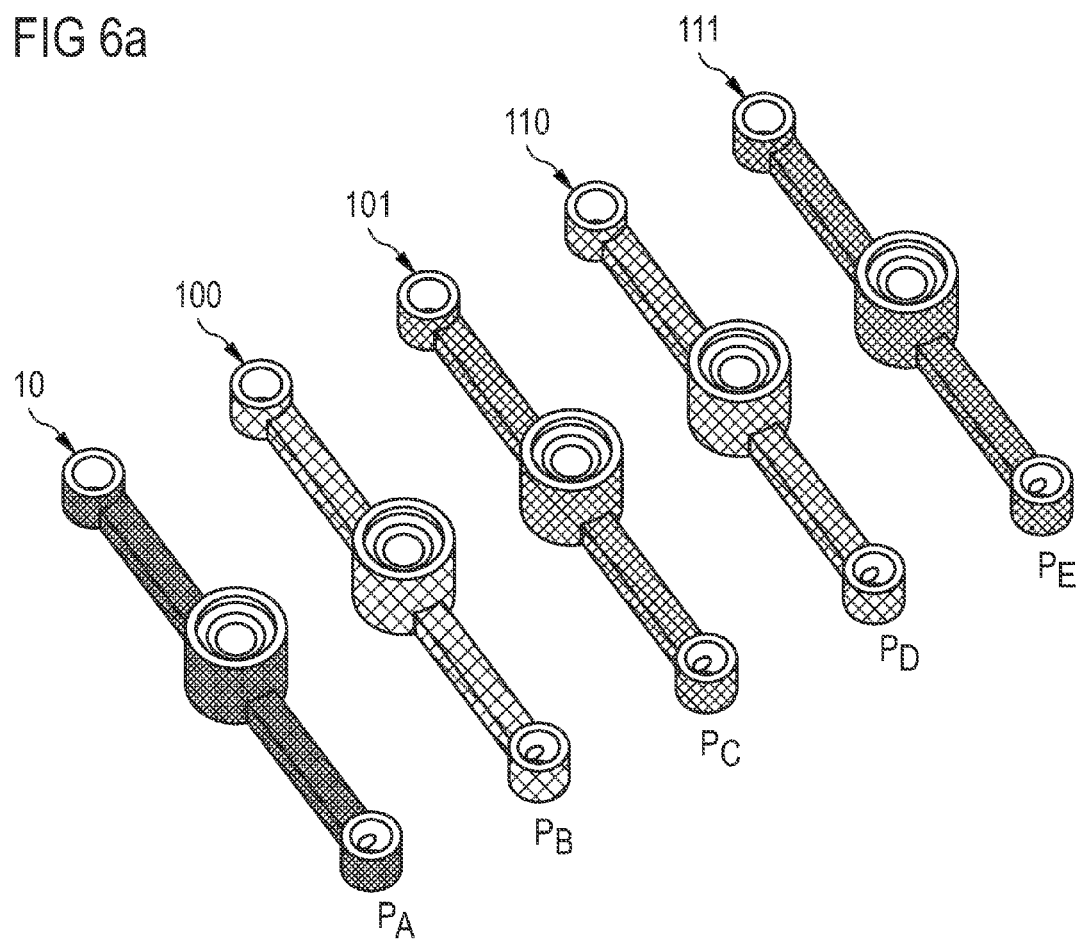
FIG. 6a is a perspective representation of a plurality of air pressure regulators having different threshold pressures.

FIG. 6a shows a set of air pressure regulators 10, 100, 101, 110, 111 according to another preferred embodiment of the invention. The end connectors and channel portions of these air pressure regulators are identical. The only difference between the shown pressure regulators consists in different threshold pressures provided by each of the pressure regulators. Pressure regulator 10 has a first pressure threshold value $P_A$; pressure regulator 100 has a second pressure threshold value $P_B$; pressure regulator 101 has a third pressure threshold value $P_C$; pressure regulator 110 has a fourth pressure threshold value $P_D$; and, finally, pressure regulator 111 has a fifth pressure threshold value $P_E$. Such different pressure threshold values or, in other words, maximum pressures may for example be provided by pressure regulating members arranged and/or configured to close at different threshold pressures. For instance, the maximum free distance between the membrane and a seat or opening closable by the membrane may be different to allow different maximum threshold pressures.

Figure 6B:
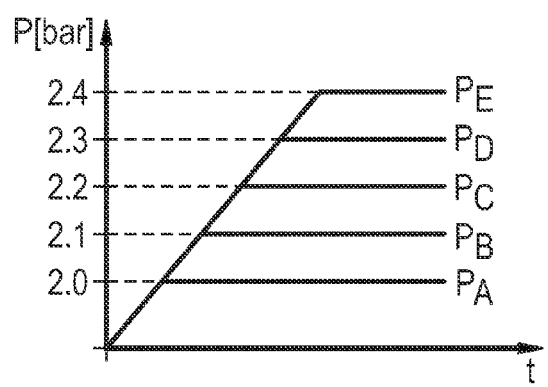

FIG. 6b shows exemplary graphs corresponding to the pressure regulators depicted in FIG. 6a and having different threshold pressures $P_A$ to $P_E$, corresponding to different pressures between 2.0 bar and 2.4 bar. Thus, pressure regulator 111 having the threshold pressure $P_E$ allows inflation of the tire until a maximum pressure or pressure limit of 2.4 bar, whereas pressure regulator 101 allows for instance merely a maximum pressure of 2.2 bar (threshold pressure $P_C$). As indicated in FIG. 6b, a higher threshold pressure results in a longer time t of air pumping until pumping is stopped by the pressure regulator 10, 100, 101, 110, 111.

FIG. 8 is a partial cross-sectional view of a pressure regulator kit according to another embodiment of the present invention. The kit comprises a pressure regulator 100, two screws 195, 190, two inserts 221, 225, a check valve 224, a filter element 22 and a cap portion 223. Similar to the aforementioned pressure regulator 10, the depicted pressure regulator 100 comprises a pressure regulation chamber 210, channel portions 230, 250, and end connectors 180, 170 for connecting the pressure regulator 210 to an air inlet extending through the sidewall of a tire. According to FIG. 8, the screw 195 extends through the end connector 180 and is screwed into the insert 221. This insert 221 has an inner thread for connection with a threaded portion of the screw 195. Inside the threaded portion of the screw 195 is arranged a filter element 222 for filtering air to be pumped into the tire. The filter element 222 may have a substantially cylindrical shape complementary to a hollow cylindrical shape of the threaded portion of the screw 195. The end cap 223 may hold the filter element 222 within the screw 195 and has at least one through hole (not visible in FIG. 8) which allows air to enter the filter element 222 through the end cap 223. An advantage of this arrangement consists in an improved exchangeability of the filter element 222. Further, the filter element 222 as such avoids dust or other disturbing materials to enter the tire which might impede the function of the pressure regulator 210 and/or of the check valve 224. The inserts 221, 225 may be glued, molded or otherwise connected to a through hole in the tire's sidewall. Alternatively, the inserts 221, 225 may be an integral part of the tire's sidewall and may form an inlet channel through the tire's sidewall.

As further shown in FIG. 8, the end connector 170 may be connected via the screw 190 to the insert 225 having an inner thread corresponding to the outer thread of the screw 190. Within that insert 225 and/or said screw 190 may be provided the check valve 224 which may block air flow through the insert 225 into the channel 230. Thus, the check valve 224 may on the one hand block air flow out of the tire through the pressure regulator 100 and on the other hand allow air flow through the pressure regulator into the tire cavity. The check valve 224 may at least partially extend into a hollow cylindrical shape of a threaded portion of the screw 190. The provision of the check valve 224 and/or the filter element 222 within at least a portion of the screw 190 or 195, respectively, allows a compact design of the pressure regulator kit.

The elements disclosed in FIG. 8 may also be used in combination with the preceding embodiments and vice versa.

The embodiments described in FIGS. 1 to 8 are directed to or include pressure regulators 10, 100, 101, 110, 111, 210 having two connecting ends 17, 18, 170, 180. However, the pressure regulators may have only one of such connecting ends 17, 18, 170, 180. In particular, a pressure regulator could be connected to an inlet 8 of an air passageway 7 but also to an outlet 9. In the latter case, the pressure regulation chamber could comprise an opening for releasing air into the tire cavity. Further, in the embodiments depicted in FIGS. 1 and 2, the air pressure regulator 10 is attached to an inlet 2 extending through the tire sidewall via a connector end 18. However, the air inlet 2 extending through the tire sidewall could conduct air into another air passageway extending essentially through the tire's sidewall in a circumferential direction. That air passageway may have an air outlet connectable with the connector 18 end of the air pressure regulator 10.

Preferably, the air passageway 7 extends at least over one third of a circumferential direction of the tire 1. However, the extension may be more or less. As depicted in FIG. 1, the air passageway or tube 7 may be preferably be arranged in a region of the tire's sidewall 3 getting into contact with a rim or in particular with the flange or outer surface of a flange of the rim onto which the tire 1 is mounted such that the deformation of the tire 1 in the footprint area FP result in squeezing of the air passage upon deformation of the tire's sidewall against the rim or flange of the rim. For example, the air passageway 7 may be arranged in a circumferential region of the sidewall 3 extending from the radially innermost portion of the bead 4 less than about 30%, preferably less than about 20%, into an outer radial direction. The air passageway or tube 7 may for instance be arranged as disclosed in US 2013/0048178, application Ser. No. 13/221,506 filed on Aug. 30, 2011 which is incorporated herein by reference. Further, the air passageway as such may be considered as a peristaltic pump, wherein possible mounting locations and design options of that peristaltic pump as such are known to the person skilled in the art.

The invention has been described with reference to best modes of carrying out the invention. Obviously, modifications and alterations will occur to others upon a reading and understanding of this specification. It is intended to include all such modifications and alterations in so far as they come within the scope of the appended claims or the equivalents thereof.

In any case the above described embodiments shall not be understood in a limiting sense. In particular, the features of the above embodiments may also be replaced by or combined with one another.

The invention claimed is:

1. A self-inflating tire assembly comprising:
a tire having a tread region, first and second sidewalls, and first and second bead regions, the first and second sidewalls extending respectively from the first and second bead regions to the tread region, wherein the tread region and the first and second sidewalls enclose an annular tire cavity;
an air passageway connected to one of the sidewalls and extending essentially in a circumferential direction of the tire for pumping air from outside of the tire into the tire cavity, the air passageway having an inlet for receiving air to be pumped into the tire cavity and an air outlet for conducting air into the tire cavity;
an air pressure regulator comprising an air pressure regulation chamber, a connector end, and a channel fluidly connecting the pressure regulation chamber with the connector end,
wherein the air pressure regulator is detachably connected to one of the air passageway inlet and the air passageway outlet via the connector end for allowing fluid communication between the channel and the air passageway via the connector end.

2. The tire assembly according to claim 1, wherein the pressure regulator is attached to the one of the sidewalls and arranged entirely within the tire cavity.

3. The tire assembly according to claim 1, further comprising a connection screw for detachably mounting the connector end to the air passageway, the connection screw comprising an air duct extending through the screw for fluidly connecting the air passageway with the channel of the air pressure regulator.

4. The tire assembly according to claim 3, wherein the connection screw has a threaded portion for connecting the connection screw to the air passageway, and wherein the threaded portion has an essentially hollow cylindrical shape allowing air to pass through the screw.

5. The tire assembly according to claim 4, wherein the connection screw has a screw head opposite to the threaded portion, and an intermediate portion arranged between the screw head and the threaded portion, wherein the air duct extends through the threaded portion and the intermediate portion to an outer surface of the intermediate portion for fluidly connecting the air passageway with the channel of the air pressure regulator.

6. The tire assembly according to claim 5, wherein the intermediate portion has an annular groove extending around a central axis of the screw, the annular groove being in fluid connection with the air duct.

7. The tire assembly according to claim 4, wherein an end of the air passageway comprises an inner thread for connecting the thread of the connection screw to the inner thread of the air passageway.

8. The tire assembly according to claim 5, wherein the pressure regulator comprises an elongated channel portion comprising the channel, and wherein the end connector has an essentially hollow cylindrical shape defining an inner surface for receiving the intermediate portion of the connection screw therein, the inner surface having an opening in fluid communication with the channel to allow air to pass out of the screw into the channel of the pressure regulator when the end connector is mounted via the connection screw.

9. The tire assembly according to claim 1, wherein the pressure regulator comprises two elongated channel portions extending linearly from essentially opposite sides of the pressure regulation chamber, and wherein a connector end is arranged at each channel portion opposite to the pressure regulation chamber.

10. The tire assembly according to claim 9, wherein both elongated channel portions extend essentially in parallel with a circumferential direction of the tire.

11. The tire assembly according to claim 1, wherein the pressure regulator comprises a pressure regulating member having two opposite sides, wherein a first side faces the tire cavity and is in direct fluid contact with the tire cavity, and wherein the second side faces the pressure regulation chamber.

12. The tire assembly according to claim 11, wherein the pressure regulation chamber comprises an opening connecting the pressure regulation chamber with the channel and wherein the pressure regulating member may move or deform to reversibly open and close the opening to reversibly allow or block air flow between the pressure regulation chamber and the channel.

13. The tire assembly according to claim 12, wherein the pressure regulating member is arranged and configured to block air flow through the opening into the tire cavity above a defined tire cavity pressure threshold value.

14. The tire assembly according to claim 12, wherein the pressure regulating member is one of a biased piston and a flexible membrane.

15. The tire assembly according to claim 14, wherein the pressure regulating member is a membrane extending essentially in parallel to the sidewall at the mounting location of the pressure regulator.

16. A pressure regulator kit for regulating the tire cavity pressure of a pneumatic tire, the kit comprising:
a plurality of air pressure regulators, each air pressure regulator comprising a pressure regulation chamber, a connector end, and a channel fluidly connecting the pressure regulation chamber with the connector end; and
a connection screw for detachably mounting the connector end to an air passageway in a tire's sidewall,
wherein the connection screw comprises an air duct extending through the screw for allowing air to pass through the screw into the channel when the connector end is mounted with the connection screw to the air passageway.

17. The kit according to claim 16, wherein the connection screw has a threaded portion for connecting the screw to the air passageway, and wherein the threaded portion has an essentially hollow cylindrical shape allowing air to pass through the threaded portion.

18. The kit according to claim 17, wherein the connection screw has a head portion and an intermediate portion between the head portion and the threaded portion, and wherein the air duct extends through the threaded portion and the intermediate portion to an outer surface of the intermediate portion for connecting the air passageway with the channel of the air pressure regulator.

19. The kit according to claim 17, wherein the intermediate portion has an annular groove extending about a central axis of the screw, the annular groove being in fluid connection with the air duct.

20. The kit according to claim 18, wherein the pressure regulator comprises an elongated channel portion comprising the channel, and wherein the end connector has an essentially hollow cylindrical shape extending perpendicularly to the elongated channel portion and defining an inner surface for receiving the intermediate portion of the connection screw therein, the inner surface having an opening fluidly connected with the channel to allow air to pass out of the screw into the channel of the pressure regulator when the end connector is mounted with the connection screw.

21. The kit according to claim 20, wherein the pressure regulator comprises two elongated channel portions extending linearly from opposite sides of the pressure regulation chamber, and wherein a connector end is arranged at each channel portion opposite to the pressure regulation chamber.

22. The kit according to claim 16, wherein each pressure regulator allows air to pass the pressure regulator up to a defined threshold pressure in the tire cavity, and wherein above that threshold pressure, air flow through the pressure regulator is blocked.

23. The kit according to claim 22, wherein each pressure regulator has threshold pressure different from another pressure regulator of the plurality of pressure regulators.

24. The kit according to claim 23, wherein each pressure regulating chamber comprises a pressure regulating member adapted to reversibly block air flow through the pressure regulation chamber by reversibly blocking an opening in each pressure regulation chamber when the pressure in the tire cavity exceeds the threshold pressure, and wherein different threshold pressures of different pressure regulators are provided by at least one of: different restoring forces of the pressure regulating members or different distances between pressure regulating members and the openings in the pressure regulation chambers.

25. The kit according to claim 23, wherein the threshold pressures of the plurality of pressure regulators are of between 1 to 4 bar, and wherein each threshold pressure of one of the plurality of pressure regulators differs from a threshold pressure of another one of the plurality of pressure regulators by at least 0.05 bar.

* * * * *